United States Patent
Collard et al.

(10) Patent No.: US 9,332,050 B2
(45) Date of Patent: May 3, 2016

(54) MEDIA STREAMING WITH ADAPTATION

(75) Inventors: Arnaud Collard, Montesson (FR); Nicolas Delahaye, Marly le roi (FR)

(73) Assignee: NXP B.V., Eindhoven (NL)

( * ) Notice: Subject to any disclaimer, the term of this patent is extended or adjusted under 35 U.S.C. 154(b) by 582 days.

(21) Appl. No.: 13/541,511

(22) Filed: Jul. 3, 2012

(65) Prior Publication Data

US 2013/0016791 A1   Jan. 17, 2013

(30) Foreign Application Priority Data

Jul. 14, 2011   (EP) .................................. 11290324

(51) Int. Cl.
| | |
|---|---|
| *H04N 7/26* | (2006.01) |
| *H04L 29/06* | (2006.01) |
| *H04N 21/234* | (2011.01) |
| *H04N 21/2343* | (2011.01) |
| *H04N 21/6587* | (2011.01) |
| *H04N 21/845* | (2011.01) |
| *H04L 29/08* | (2006.01) |

(52) U.S. Cl.
CPC ........ *H04L 65/607* (2013.01); *H04N 21/23406* (2013.01); *H04N 21/23424* (2013.01); *H04N 21/23439* (2013.01); *H04N 21/6587* (2013.01); *H04N 21/8455* (2013.01); *H04N 21/8456* (2013.01); *H04L 65/4084* (2013.01); *H04L 67/02* (2013.01)

(58) Field of Classification Search
CPC .................................................... H04L 65/607
USPC .................................................... 375/240.25
See application file for complete search history.

(56) References Cited

U.S. PATENT DOCUMENTS

| | | | |
|---|---|---|---|
| 7,502,070 B2 | 3/2009 | Yamaguchi et al. | |
| 7,653,251 B2 * | 1/2010 | Dei ........................ | H04N 7/152 382/232 |
| 7,711,051 B2 * | 5/2010 | Yoshinari ....... | H04N 21/440254 375/240.25 |
| 7,826,536 B2 * | 11/2010 | Hannuksela et al. | .... 375/240.26 |
| 8,089,948 B2 | 1/2012 | Garudadri et al. | |
| 8,218,651 B1 * | 7/2012 | Eshet et al. .............. | 375/240.26 |
| 8,335,262 B2 * | 12/2012 | Hluchyj ........... | H04N 21/23406 370/477 |
| 8,396,114 B2 * | 3/2013 | Gu et al. ................... | 375/240.01 |
| 8,582,647 B2 | 11/2013 | Shah et al. | |

(Continued)

OTHER PUBLICATIONS

Google patent search history log.*

(Continued)

*Primary Examiner* — William C Vaughn, Jr.
*Assistant Examiner* — Luis Perez Fuentes
(74) *Attorney, Agent, or Firm* — Rajeev Madnawat

(57) ABSTRACT

A method and apparatus for receiving a media stream provided in a plurality of different, alternative encoded representations. Each representation comprises a series of discrete fragments and each fragment comprises a contiguous temporal segment of the stream. The method comprises: obtaining (240, 310) at least a part of a first fragment from a first one of the representations; obtaining (210, 320) at least a part of a second fragment from a second one of the representations, wherein the first and second fragments comprise temporal segments that overlap at least partially; decoding (250, 330) a first temporal segment of the media stream from the first fragment; and decoding (260, 350) a second, later temporal segment of the media stream from the second fragment. In this way, the method switches from receiving the stream in the first representation to receiving it in the second representation.

19 Claims, 6 Drawing Sheets

(56) References Cited

U.S. PATENT DOCUMENTS

| | | | | |
|---|---|---|---|---|
| 8,582,663 | B2* | 11/2013 | Hannuksela | 375/240.26 |
| 8,838,722 | B2* | 9/2014 | Ridges et al. | 709/208 |
| 2002/0191116 | A1* | 12/2002 | Kessler et al. | 348/723 |
| 2006/0188014 | A1* | 8/2006 | Civanlar et al. | 375/240.03 |
| 2009/0234938 | A1* | 9/2009 | Amsterdam | H04N 2/23424 709/221 |
| 2009/0328124 | A1* | 12/2009 | Khouzam et al. | 725/116 |
| 2010/0135392 | A1* | 6/2010 | Kim | 375/240.13 |
| 2010/0161825 | A1* | 6/2010 | Ronca et al. | 709/231 |
| 2011/0099594 | A1 | 4/2011 | Chen et al. | |
| 2011/0246616 | A1* | 10/2011 | Ronca et al. | 709/219 |
| 2012/0233345 | A1* | 9/2012 | Hannuksela | 709/231 |
| 2013/0016791 | A1* | 1/2013 | Collard | H04L 65/607 375/240.25 |

OTHER PUBLICATIONS

Microsoft Corp. "[MS-SSTR]: Smooth Streaming Protocol Specification," 57 pgs. (Mar. 18, 2011).

Pantos, R. et al., "HTTP Live Streaming // draft-pantos-http-live-streaming-06" Apple Inc., 25 pgs. (Mar. 2011).

"3$^{rd}$ Generation Partnership Project, Technical Specification 3GPP TS 26.247 v1.5.0, Group Services and System Aspects Transparent end-to-end Packet-switched Streaming Service (PSS); Progressive Download and Dynamic Adaptive Streaming over HTTP (3GP-DASH), Release 10," 91 pgs. (May 16, 2011).

Extended European Search Report for European patent appln. No. 11290324.0 (Nov. 30, 2011).

* cited by examiner

MEDIA STREAMING WITH ADAPTATION

CROSS-REFERENCE TO RELATED APPLICATIONS

This application claims the priority under 35 U.S.C. §119 of European patent application no. 11290324.0, filed on Jul. 14, 2011, the contents of which are incorporated by reference herein.

This invention relates to methods and apparatus for smoother adaptation between different versions of the same media stream. It is particularly relevant to adaptive bit-rate streaming technology, such as adaptive Hyper-Text Transport Protocol (HTTP) streaming.

Audio/Video Streaming over the internet is an important feature used by many users of the World Wide Web. Various protocols have been specified to enable the streaming of audio and/or video content. Conventionally, these protocols were usually based on RTSP and UDP protocols.

More recently, streaming protocols using other protocols have been introduced. These protocols—known as "HTTP streaming" protocols—use TCP and HTTP protocols to transfer the audio and video data. Such protocols have the advantages of:
- avoiding use of UDP ports that are difficult to configure on devices and can be blocked by firewalls;
- being able to use existing HTTP caches spread throughout the internet;
- enabling better adaptation of the content quality with regard to the network throughput.

Examples of HTTP streaming protocols include: Apple Live Streaming; IIS Smooth Streaming; and 3GPP Adaptive Streaming. The Moving Picture Experts Group (MPEG) is currently developing another protocol, which will be published as International Standard ISO/IEC 23001-6 Dynamic Adaptive Streaming over HTTP (DASH). For all these protocols, there is a set of common underlying features:
- The client requests, from a streaming server, a manifest file which describes the streaming session;
- The audio/video data are split in several files (called chunks or fragments). The client can determine the URLs of these fragment-files by parsing the manifest file.
- The client then requests the individual fragment-files by using HTTP GET requests through TCP protocols.
- Each fragment contains a segment of the audio and/or video covering a time-interval of a few seconds, when the decoded signals are played. Typically, the time-intervals are of in the range of about 2 to about 10 seconds. In the existing schemes, all of the fragments have the same duration.
- Each media stream is provided at a range of different levels of quality. The client application can choose the desired version of the movie according to the available throughput (bandwidth) of the network. This feature is known as "adaptive streaming". The application can also change between versions of different quality, during the playback of the stream. This "live" switch is possible thanks to the splitting of the stream into multiple chunks in a predictable manner for all the alternative versions.

Adaptive switching between versions is typically triggered according to the data buffer level inside the client-application. If the buffer is becoming full, the client can choose a content version which has a higher bit-rate (corresponding to a higher quality). If the buffer decreases dangerously (such that it appears it may empty entirely), the client should choose a lower-rate, alternative version of the stream, to avoid playback stopping while re-buffering occurs.

Here, the data-rate of a stream refers to the volume of data (that is, number of bits) needed to encode a unit time-interval of the underlying signal. It may be expressed, for example, as a number of Kilo-bits per second (Kpbs) or Mega-bits per second (Mbps). This will depend on a variety of factors, which may include the sampling rate, resolution of quantization and (for video) spatial size of the frames. To encode the media at a higher-quality, it is typically necessary to increase one of these factors, resulting in an increase in data-rate. If the bandwidth of the communications channel (also often expressed in Mbps of Kbps) is persistently less than the data-rate of the stream, then the media will not play correctly, because the client will be playing the data faster than it is being received.

FIG. 1 shows how the whole data of an Audio/Video (AV) stream is available as a set of fragments on the streaming server. The fragments are all of equal temporal duration (when played). However, the fragments of different versions have different sizes, due to the different data-rates of each version. The fragments actually retrieved by the client are shaded. In this example, there are three different versions, at 384, 256, and 128 Kbps, respectively, shown in three rows. Time is shown on the horizontal axis. The network throughput (bandwidth) is reducing and so the client is switching to lower-quality (lower data-rate) versions so that it can download smaller fragments. A typical pattern of messages exchanged between the client and server is illustrated in FIG. 2.

Audio and video data are compressed when transmitted with such protocols. The known audio/video compression algorithms used in these protocols include but are not limited to: H.264, or VC-1 for video; and AAC, MP3, WMA for audio. For the video compression algorithms listed, the compression is based on temporal references. To decode one frame, the decoder may need one or several other (previously decoded) frames in the stream. There are three types of frames, conventionally called:
- "I-frame": Intra-coded frame, coded independently of all other frames
- "P-frame": Predictively coded frame, coded based on previously coded frame
- "B-frame": Bi-directionally predicted frame, coded based on both previous and future coded frames.

According to an aspect of the present invention, there is provided a method of receiving a media stream provided in a plurality of different, alternative encoded representations, each representation comprising a series of discrete fragments, each fragment comprising a contiguous temporal segment of the stream, the method comprising:
obtaining at least a part of a first fragment from a first one of the representations;
obtaining at least a part of a second fragment from a second one of the representations, wherein the first and second fragments comprise temporal segments that overlap at least partially;
decoding a first temporal segment of the media stream from the first fragment; and
decoding a second, later temporal segment of the media stream from the second fragment,
thereby switching from receiving the stream in the first representation to receiving it in the second representation.

This provides a method for switching between the different encoded representations, in mid-stream. Note that references, above, to "first" and "second" fragments do not imply that these fragments are obtained, decoded or played in a particular sequence. The words are used purely as general labels to identify the different fragments clearly.

The media stream may comprise audio signals or video signals or both. The media stream is typically encoded in a digitally compressed form. The different representations may be compressed in different ways, each exhibiting a different quality of reproduction. Typically, each representation is encoded with a different bit-rate; therefore, the sizes of the fragments may be different in the different representations.

Each fragment represents the media over a finite, contiguous time interval. The time intervals may be chosen identically for each of the representations. In this case, each representation has the same number of fragments, and corresponding fragments in different representations all cover the same time interval. The first and second fragments (from the respective first and second representations) may relate to identical time intervals (segments) of the stream.

The media stream is preferably encoded with temporal dependency. For example, the media stream may be a video stream comprising video frames that are encoded using temporal prediction. When the encoded representations include temporal dependencies, it is in general not possible to begin decoding a different representation at an arbitrary time instant in the stream. Instead, the decoder must in general wait for a reference point, such as an intra-coded frame (I-frame) of a video.

Obtaining at least a part of a fragment preferably comprises requesting the fragment and receiving at least a part of the fragment in response. A fragment may be requested by using the HTTP "GET" command.

The second temporal segment is "later" in the sense that it has a presentation time that is after the presentation time of the first temporal segment. The second temporal segment is preferably successive to the first temporal segment. For a video, for example, the last frame of the first temporal segment and the first frame of the second temporal segment are preferably consecutive frames.

According to some embodiments, when it is desired to switch from a first representation having a first data-rate to a second representation having a second data-rate, the method comprises: obtaining at least a part of the second fragment from the second representation; obtaining at least a part of the first fragment from the first representation; detecting the position in the second fragment of reference data from which it is possible to start decoding the second representation; decoding the first fragment until the position corresponding to the reference data; and decoding the second fragment, starting with the reference data.

In particular, when it is desired to switch from a first lower data-rate representation to a second higher data-rate representation, the method preferably comprises: obtaining at least a part of the second fragment from the second, higher-rate representation; obtaining at least a part of the first fragment from the first, lower-rate representation; detecting the position in the second fragment of reference data from which it is possible to start decoding the second representation; decoding the first fragment until the position corresponding to the reference data; and decoding the second fragment, starting with the reference data.

This method delays the switch between representations until a point in the stream when reference data is available in the second, higher-rate representation (in the second fragment). To do this, a corresponding first fragment is obtained from the first representation (at the existing, lower data-rate). This first fragment is decoded up to the time-instant that corresponds to the reference data. Thereafter, the second (higher-rate) fragment is decoded. This can ensure a smooth transition between the representations, without pausing or skipping a part of the stream. If the media stream comprises a video, the reference data may comprise an I-frame.

Although additional bandwidth is required, to obtain the overlapping parts of the fragments of two different representations, this burden is not usually significant. Since the decoding method is switching from the low-rate to a high-rate version of the stream, it is assumed that there is sufficient capacity to support the high-rate fragments. In this case, the additional burden is to download (at most) one extra fragment at the low bit-rate.

The part of the first, low-rate fragment may be requested after the second, high-rate fragment has been requested; and it may optionally be requested after some or all of the high-rate fragment has been received.

Note that this method may also be applicable in a case where the first representation has a data-rate that is higher than the data-rate of the second representation. However, in such a case, other methods may be found to be more efficient or effective for switching between the representations. The present description will therefore concentrate on embodiments in which the first data-rate is lower.

The method optionally comprises: detecting the position of the reference data in the second fragment; and in response, preferably obtaining only a part of first fragment, wherein the size of the part obtained depends on the detected position.

The step of obtaining only a part of the first fragment may comprise cancelling an earlier request to obtain the whole fragment.

In this case, the first fragment may be requested before or after the position of the reference data has been detected. In either case, the download of the first fragment is cancelled when enough of the first fragment has been received—that is, the first fragment has been received up to the position corresponding to the reference data.

The step of obtaining only a part of the first fragment may comprise requesting a specified part of the fragment.

In this case, the first fragment is requested only after the position of the reference data has been detected. The size of the part of the first fragment that is needed may be estimated, based on the relative data-rates of the two representations and the detected position of the reference data. A request for part of a fragment may be performed using a GET command of the Hyper-Text Transport Protocol (HTTP) version 1.1, by specifying a byte-range to be retrieved.

The method may further comprise a preceding step of determining that decoding should switch to the second, higher data-rate representation, by detecting an excess of data at the first data-rate in a memory buffer.

The excess of data may be detected by comparing the amount of data in the buffer to a threshold. If the amount is greater than the threshold, it indicates that an available communications bandwidth is greater than that currently being used by the fragments at the lower-rate. That is, the bandwidth is not being fully utilised and the data-rate can consequently be increased.

Preferably, upon deciding to switch to the second, higher-rate, a subsequent fragment at the higher-rate is requested.

This means that the "second" fragment obtained from the second (high-rate) representation is the next fragment in the sequence of fragments—and this is the first fragment requested after deciding to switch representations. This fragment begins at a time-position later than the point already reached in the decoding of the fragment-sequence at the lower-rate.

The alternative would be to request a current fragment at the higher-bit rate, in order to find an earlier time-instant at which to switch representations (that is, earlier reference data of the second representation). However, this would have the drawback that the higher-rate fragment might not be downloaded in time to be used.

In some other embodiments, when it is desired to switch from a first representation having a first data-rate to a second representation having a second data-rate, the method comprises: obtaining at least a part of the first fragment from the first representation; obtaining at least a part of the second fragment from the second representation; decoding a successfully received part of the first fragment; synthesizing reference data for the second representation, based on the successfully received part of the first representation; and decoding a successive part of the second fragment, using the synthesised reference data.

In particular, when it is desired to switch from a first higher data-rate representation to a second lower data-rate representation, the method preferably comprises: obtaining at least a part of the first fragment from the first, higher-rate representation; obtaining at least a part of the second fragment from the second, lower-rate representation; decoding a successfully received part of the first fragment; synthesizing reference data for the second representation, based on the successfully received part of the first representation; and decoding a successive part of the second fragment, using the synthesised reference data.

This method uses as much data at the higher data-rate as has been successfully received. This may comprise using a part of the first fragment at the high rate that is already present in a buffer memory. While the available higher-rate data is decoded (and optionally played) the method obtains at least a part of the corresponding fragment at the lower data-rate. When the high-rate buffer is empty, the method switches immediately to the lower-rate version of the stream. This is done by constructing an approximation of reference data needed for the next time instant in the lower-rate version. The approximation is derived from the preceding, higher-rate data. The approximation may comprise reducing a quality or resolution of data decoded from the higher-rate representation, so that it corresponds to the lower-rate data.

The approach of creating synthetic reference data for the lower-rate decoding avoids the need to wait until real reference data is found in the second fragment. This is beneficial, because there may be a time-gap between the end of the successfully received part of the first fragment and the earliest real reference data in the second fragment. This would cause the played media stream to freeze and skip the missing time-segment. Note that, in general, it may not be possible to obtain additional data at the higher data-rate This is because, typically, the reason for switching to a lower data-rate representation will be that insufficient communications bandwidth is available to support the higher rate.

The method may further comprise cancelling the downloading of a remaining part of the first fragment.

Note that this method may also be applicable in a case where the first representation has a data-rate that is lower than the data-rate of the second representation. In this case, the step of synthesising reference data may include upsampling or interpolating data from the first representation, to create synthetic reference data suitable for the second representation. However, in such a case, other methods may be found to be more efficient or effective for switching between the representations. The present description will therefore concentrate on embodiments in which the first data-rate is higher.

The step of obtaining a part of the second fragment preferably comprises requesting a part of the second fragment corresponding to a remaining part of the first fragment that was not successfully received.

The correct part of the fragment to request may be estimated based on the relative data-rates of the two representations, the sizes of the fragments and the proportion of the first fragment that was successfully received.

The method may further comprise a preceding step of determining that decoding should switch to the second, lower data-rate representation, by detecting a shortage of data at the first data-rate in a memory buffer.

The shortage of data may be detected by comparing the amount of data in the buffer to a threshold. If the amount is less than the threshold, it indicates that an available communications bandwidth is insufficient for receiving the fragments at the higher-rate. In this case, the buffer is likely to empty soon (unless the bandwidth quickly increases again) and the data-rate should consequently be reduced, to avoid buffer under-run.

Alternatively or in addition, the decision to switch representations may be made by evaluating throughput in the network. This can be done, for example, by measuring the rate at which data is being received. This applies both for determining whether to switch to a higher data-rate and for determining whether to switch to a lower data-rate.

The media stream may comprise a video having a plurality of frames, encoded using temporal prediction among the frames. Note that the invention may also be beneficial for streams of other types, such as audio-streams, if they are encoded with temporal dependencies. Thus, in some embodiments, the media stream comprises an audio signal encoded using temporal prediction.

Also provided is a computer program comprising computer program code means adapted to control a physical computing device to perform all the steps of any preceding claim if said program is run on a computer.

Also provided is a computer program as mentioned above embodied on a computer readable medium.

According to another aspect of the invention, there is provided a receiver apparatus for receiving a media stream provided in a plurality of different, alternative encoded representations, each representation comprising a series of discrete fragments, each fragment comprising a contiguous temporal segment of the stream, the apparatus comprising:

a streaming scheduler, adapted to:
obtain at least a part of a first fragment from a first one of the representations; and
obtain at least a part of a second fragment from a second one of the representations, wherein the first and second fragments comprise temporal segments that overlap at least partially; and
a decoder, adapted to:
decode a first temporal segment of the media stream from the first fragment; and
decode a second successive temporal segment of the media stream from the second fragment,
the apparatus thereby being operable to switch from receiving the stream in the first representation to receiving it in the second representation.

In some embodiments of the apparatus, when it is desired to switch from a first lower data-rate representation to a second higher data-rate representation, the scheduler is operable to: obtain at least a part of the second fragment from the second, higher-rate representation; and obtain at least a part of the first fragment from the first, lower-rate representation, and wherein the apparatus further comprises a stream reader, adapted to detect the position in the second fragment of reference data from which it is possible to start decoding the second representation, and wherein the decoder is adapted to: decode the first fragment until the position corresponding to the reference data; and decode the second fragment, starting with the reference data. Nevertheless, note that—in general, for embodiments of this apparatus—the first data-rate may be greater or less than the second data-rate.

In other embodiments of the apparatus, when it is desired to switch from a first higher data-rate representation to a second lower data-rate representation, the scheduler is operable to: obtain at least a part of the first fragment from the first, higher-rate representation; obtain at least a part of the second fragment from the second, lower-rate representation, and the decoder is adapted to: decode a successfully received part of the first fragment; synthesise reference data for the second representation, based on the successfully received part of the first representation; and decode a successive part of the second fragment, using the synthesised reference data. Nevertheless, note that—in general, for embodiments of this apparatus—the first data-rate may be greater or less than the second data-rate.

The invention will now be described by way of example with reference to the accompanying drawings, in which.

In all HTTP streaming protocols, audio and video data may be compressed using known audio/video compression algorithms. Video compression algorithms, in particular, are usually based on temporal prediction, and so most video frames rely on the availability, at the decoder, of other decoded frames. When playing a stream using adaptive streaming, the client application may decide to switch to a different alternative version of the movie in the middle of playback. To do this, it requests the next fragment of the new version from the server. However, if this new fragment does not start with a suitable reference frame, the decoder will not be able to decode any frames until the next reference is reached. The consequence will be a video freeze or a very bad video quality for several seconds. This is a result of limitations in conventional streaming content production. Typically, the reference frame desired is an I-frame, since this frame does not depend on any previously decoded frames. Since the different versions of the stream are usually encoded independently, it would be difficult to temporally align I-frames with the start of all fragments, across all versions, for the entire movie.

It is desirable for a good adaptive streaming product to have a smooth transition when the content quality has been adapted to the available network throughput. The present inventors have recognised that this can be achieved if overlapping fragments of two different versions are retrieved by the client. Here, "overlapping" means that the two fragments correspond to the same playback time. Preferably, the client will adopt a different strategy depending on whether it wishes to switch to a representation with a lower or a higher data-rate. These two strategies will be described below, as two separate embodiments of the invention.

Figure 1:
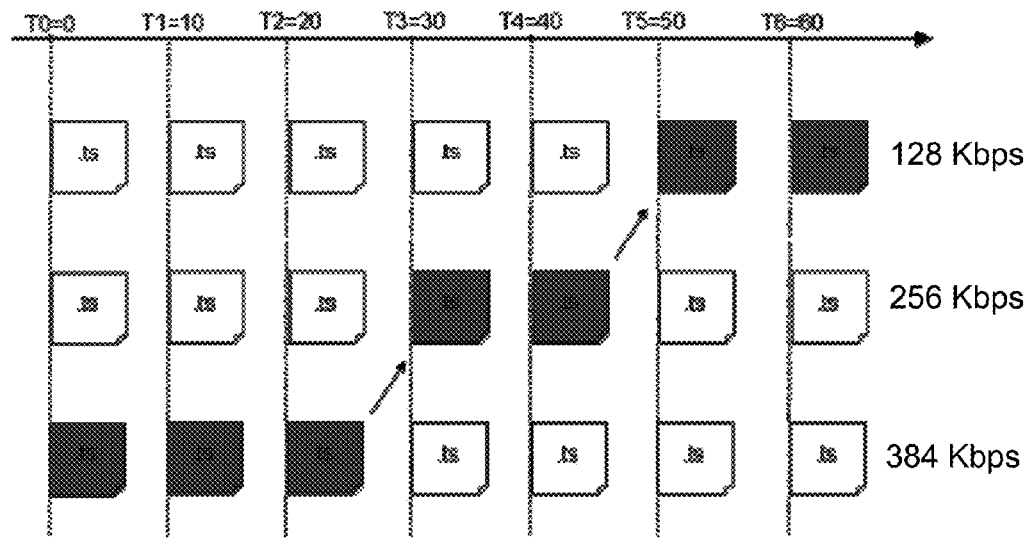
FIG. 1 shows an example of a set of file fragments on a HTTP streaming server.
Figure 2:
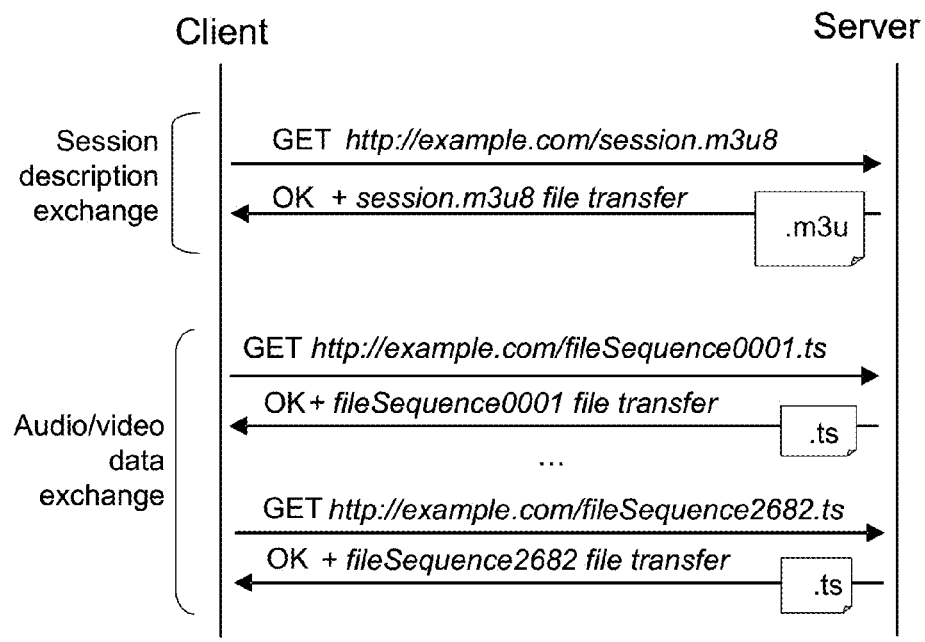
FIG. 2 shows a typical pattern of messages exchanged between a client and HTTP streaming server.
Figure 3:
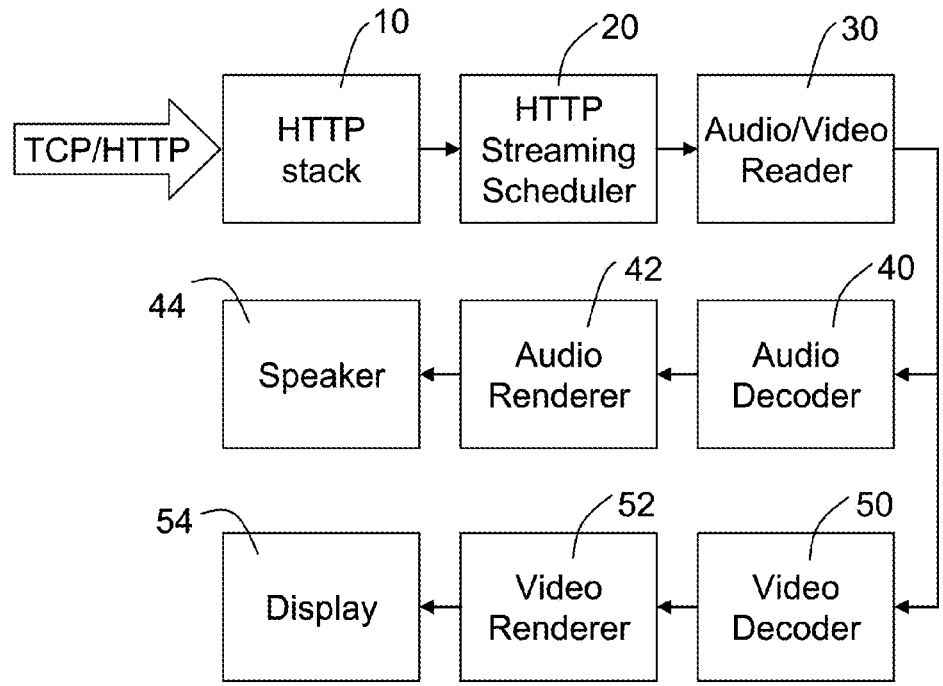
FIG. 3 is a block diagram of an apparatus according to an embodiment of the invention.

Firstly, however, a streaming-client architecture according to an embodiment of the invention will be described, with reference to FIG. 3. The client comprises a HTTP stack 10 for making HTTP requests and receiving HTTP data; and a HTTP streaming scheduler 20. The scheduler 20 schedules (plans) the request of fragments through HTTP and organises the received data. It requests data via the HTTP stack 10, and—once received—provides the data to an audio/video reader component 30 for parsing. The reader 30 parses (reads) the data contained in the fragments and separately outputs audio and video data to an audio decoder 40 and video decoder 50, respectively. The video decoding pipeline consists of the video decoder 50, which outputs uncompressed (decoded) video frames to a video renderer 52. From the renderer, the frames are output to be displayed on a display 54. In addition to the audio decoder 40, the audio decoding pipeline consists of an audio renderer 42, which receives decoded audio from the decoder 40 and a speaker 44 which receives electrical drive signals from the renderer 42. The present invention is implemented primarily in the streaming scheduler 20; the audio/video reader 30 and the video decoder 50. Note that if the audio bit-stream uses temporally predictive coding, the invention may be implemented also in the audio decoder 40. Each of these components may be implemented as separate hardware units or by software modules running on a general purpose processor.

According to the first embodiment, the client application has detected that the network throughput is higher than the bit-rate of the representation currently being played. The application will choose to upgrade to a better quality, which corresponds to a higher bit-rate. In general, the first fragment retrieved from this higher-rate, alternative representation will not have an I-frame at its start. According to the first embodiment, the client application analyses the content of this new fragment-file as it is being received. It can discover the different encoded frames present and their associated time stamps, and thereby detects the position of the first I-frame. At this stage the client application knows that it cannot decode the new fragment during a given playback interval, up until the first I-frame of the fragment.

According to the first embodiment, the client application will instead retrieve the corresponding fragment of the lower-rate representation (that is, the version of the stream that was being played previously). This fragment corresponds to the same playback time as the new fragment of the higher-rate representation. The client will use the content of this fragment to fill in the interval where no I-frame is available in the new fragment. This is possible as the data of the lower-rate fragment is the logical continuation of the version of the stream being received before the adaptive switch.

Note that this additional download of one extra fragment is possible only if there is sufficient time and network bandwidth to do so. However, the fact that the client application has taken the decision to switch to a higher alternative bit-rate usually implies that it there is already surplus data in its memory-buffer. Indeed, the application may deliberately choose to increase its buffering levels before switching.

Figure 4:
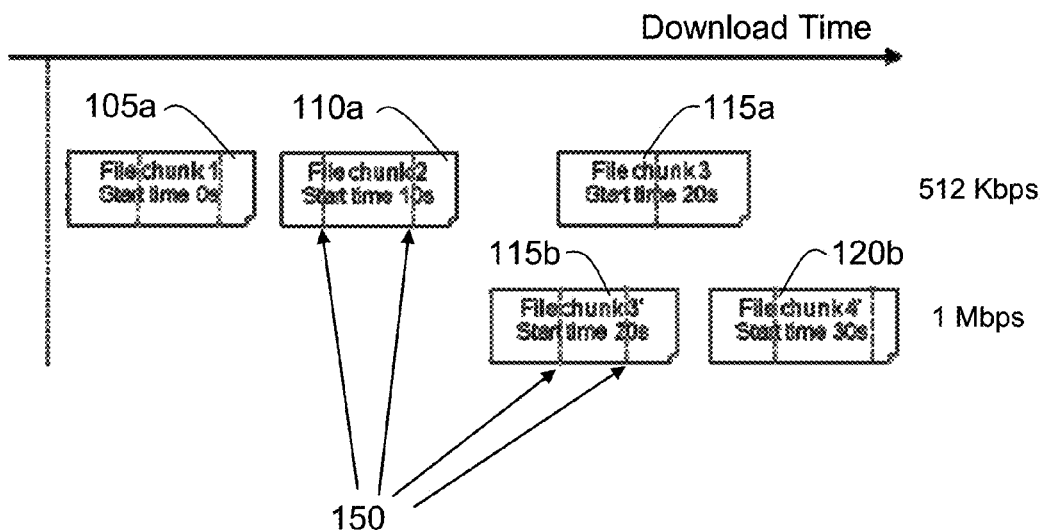
FIG. 4 shows a download schedule according to a first embodiment of the invention.
Figure 5:
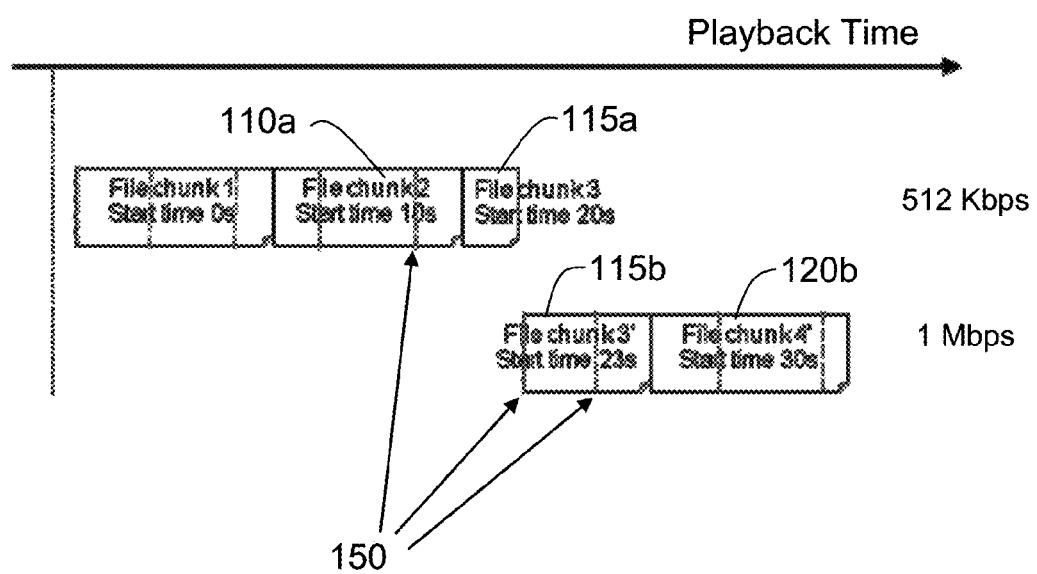
FIG. 5 shows the playback schedule according to the first embodiment.
Figure 6:
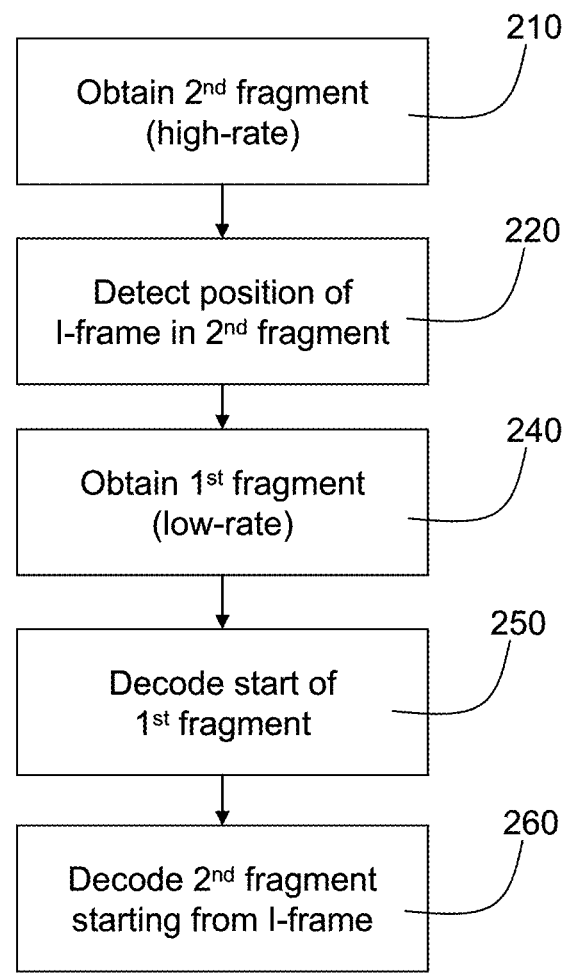
FIG. 6 is a flowchart of a method according to the first embodiment.

In greater detail, in this first method, the client will download additional data from the previous (lower-rate) representation to fill the time gap where no I-Frame is yet available in the new, higher-rate fragment. FIGS. 4-5 illustrate a download and playback sequence according to this embodiment. FIG. 6 illustrates a corresponding flowchart of the method. FIG. 4 is a graphical representation of the download schedule executed by the HTTP Streaming Scheduler (20). In this figure, the client application is downloading the two first fragments 105a, 110a of the representation which is encoded at 512 Kbps. Before the download of the third one 115a, which corresponds to a playback time of 20 s, the client decides to switch to a better quality version, because it has detected that the network throughput is good enough, and that a memory buffer in the reader 30 is full enough. The scheduler 20 controls the HTTP stack 10 to download 210 a subsequent fragment 115b of the alternative, higher-rate representation, encoded at 1 Mbps.

As soon as this fragment 115b begins to be received 210 by the scheduler 20, it is passed to the reader 30 for parsing. The reader 30 detects that the new fragment 115b does not begin with an I-frame 150. Eventually, the reader detects 220 the position of the first I-frame 150 in the higher-rate fragment 115b. (Note that the I-frames in each fragment are indicated by the dashed lines in FIGS. 4-5.) The reader also requests 240 the corresponding fragment 115a at the original, lower bit-rate.

In greater detail, the reader 30 determines the presentation time of each encoded video frame by parsing the system time provided in the containers used by HTTP streaming protocols. The system time may be (i) the time provided in MPEG-2 TS packets for HTTP live streaming; or (ii) the time provided by MP4 file format for both IIS Smooth Streaming and 3GPP Adaptive Streaming protocols.

To discover whether each of the frames is an I-frame 150 or not, the reader 30 can (i) use the RAP information inside MP4 file format for both IIS Smooth Streaming and 3GPP Adaptive Streaming protocols (sync sample table stss box); (ii) parse the random access indicator in the TS packets for Apple Live Streaming; or (iii) directly parse the video bit-stream and discover I-frames 150 using video frame headers.

Once the timing of the first I-Frame 150 is detected 220, the application can either wait for the end of the download 210 of the higher-rate fragment 115b before launching the download of the additional fragment 115a, or it can launch the latter download in parallel, using a second TCP socket. As a further alternative, the reader may initiate the download of additional fragment 115a immediately as soon as it is determined that the higher-rate fragment 115b does not have an I-frame at its beginning. In general, the download 240 of the additional fragment 115a preferably proceeds concurrently with the download 210 of the higher-rate fragment.

Then, when playing the content, the reader 30 will send to the decoder 50:
  The initial seconds of the lower-rate fragment 115a, until a time-instant just before the position of the I-Frame in the higher-rate fragment 115b (3 seconds in this example)
  The end-portion of higher-rate fragment 115b, starting from the first I-frame 150
That is, the decoder 50 will decode 250 the start of the lower-rate fragment 115a and will decode 260 the end of the higher-rate fragment 115b.

Note that the download order described above is beneficial. The client could start to download the extra, lower-rate fragment 115a earlier, but it is preferably to have retrieved at least part of the higher-rate fragment 115b before doing so. This will potentially avoid downloading the extra fragment 115a in the case that the new fragment 115b begins with an I-frame. Also, it may allow the amount of data downloaded in the extra fragment 115a to be limited. This enhancement will be described below.

In order to limit the network throughput that is required to solve the problem, two alternatives are proposed. In both cases, the idea is to download only the amount of data necessary in the additional fragment 115a. In the first method the reader 30 analyses the data additional fragment 115a while it is being received.

When the time corresponding to the I-Frame in fragment 115b is reached, the HTTP scheduler 20 cancels the download of the extra fragment 115a by disconnecting the TCP socket. This method has the advantage that the strict minimum of data is downloaded, but it requires two instances of the reader 30, if the downloads are conducted in parallel, so as to be able to determine frame time-stamps concurrently while the downloading. Also the socket disconnection during a HTTP download in progress is a feature which could be unavailable on some devices.

In the second method, the client estimates the amount of data to be downloaded according to the time stamp of the I-Frame 150 in the new fragment 115b and the bit-rate of the lower-rate representation. Then the scheduler 20 requests a partial download of the additional fragment 115a, by using HTTP GET request with a specified Byte Range, as specified in HTTP version 1.1.The formula used to compute the amount of data to be downloaded is as follows:

$$nBytes = \frac{(CTS(IFrame) - CTS(\text{First Frame})) \times \text{Bitrate}}{ChunkDuration \times 8}$$

Where:
  nBytes is the number of bytes of the additional fragment 115a to be downloaded;
  CTS(IFrame) is the time stamp in seconds of the I-Frame in the new fragment 115b;
  CTS(FirstFrame) is the time stamp in seconds of the first frame present in the new fragment 115b;
  Bitrate is the (lower) bit-rate of the extra fragment 115a; and
  ChunkDuration is the duration in seconds of each chunk in the streaming session.

This second method has the advantage that the data does not need to be analysed as it is being received, and so the download can be performed in parallel, without a second instance of the reader 30. It has the disadvantage of adding uncertainty, because the instantaneous bit-rate varies from the average one, and therefore the requested byte-range of data will not perfectly match what is needed. As a consequence a small number of frames might be dropped at playback time, but this may be invisible by the user if the duration is short enough. Note that the second method also depends upon support for HTTP 1.1 at both the client and server side.

According to the first embodiment, since the client must download more data than in the conventional streaming scheme, it may be desirable for the application will to tune its buffer levels. That is, the application will preferably ensure that, when switching to a higher-quality version of the stream, its buffer level is high enough to support the download of the additional fragment 115a. This is because the network throughput will be less or not available for the "normal" download of the new fragment 115b. One alternative solution could be also to abort the extra download 240 if the reader 30 detects that the buffer levels are getting too low and that re-buffering will be necessary.

To ensure the same stability with regard to re-buffering, the client application can take a defensive approach for the buffer level: if we consider that on average the client will need to download half of the extra fragment 115a, it means that the buffer level should be increased according to the following formula:

$$Dur = \frac{ChunkDuration \times Bitrate}{Throughput \times 2}$$

Where:
- Dur is the additional buffer level in seconds that we have to provide before switching;
- Throughput if the current network throughput;
- Bitrate is the bit-rate of the additional fragment 115a; and
- ChunkDuration is the duration in seconds of each fragment in the streaming session.

A second embodiment of the invention will now be described, with reference to FIGS. 7-8. In this embodiment, the client is switching from a first, higher-rate version of the stream to a second, lower-rate version. The method of the first embodiment is less appropriate in this case, where the application has detected that the network throughput is lower than the data-rate of the representation currently being received. Indeed, this case is usually triggered by detecting that the buffering level of the application is low; therefore, the network typically does not have enough bandwidth to download additional data. Trying to download additional fragments might increase the risk that the buffer empties, playback stops and re-buffering becomes necessary.

Conventionally, the default application behaviour in this case is to switch to a lower-rate alternative version once a fragment is fully played—that is, all media information has been decoded by the decoders. This process avoids "wasting" network bandwidth by downloading only those fragments of the video that will actually be played. Nevertheless it has two major drawbacks:
- It has a direct impact on buffer memory usage. The application can minimise this behaviour by buffering a large amount of data before starting playback. However, this in turn results in a slow start-up.
- It prevents the application issuing a "quick" request to the HTTP server to receive a more suitable video stream—that is, a video stream fitting the network throughput. Such a slow response may lead to a jerky video experience due to re-buffering.

In the present embodiment, therefore, a switch to a lower bit-rate representation is triggered as soon as possible, in order to maintain a smooth video experience. Nevertheless, the client faces the same problem described above: it is unlikely that the new lower-rate representation will contain an I-frame at the desired switch-over point—preventing smooth video decoding until an I-frame is reached.

According to the method of the second embodiment, the client application uses the latest available video frame (from the last higher-rate fragment) to generate a reference frame to initiate the video decoding of the first lower-rate chunk. The latest video frame will not provide a perfectly accurate reference frame; however, it will have—on average—higher quality than the corresponding frame in the lower bit-rate representation. Moreover, visual artefacts resulting from the use of this non-exact reference frame will have a limited persistence, because the next I-frame will clear them.

In greater detail, the "latest available video frame" means the video frame with the closest timing information to the first video frame timing in the lower-rate alternative representation. It should be noted that:
- The new, lower-rate video has, on average, lower quality than the previous one, because the higher-quality version uses a higher bit-rate than the lower-quality one.
- The latest available video frame may require down-sampling in order to match the frame size of the lower-quality video stream. To limit the quality reduction related to the down-sampling process, a filter enhancing the sharpening of the picture may be selected. Suitable filters include, but are not limited to, bi-cubic down-sampling.

Figure 7:
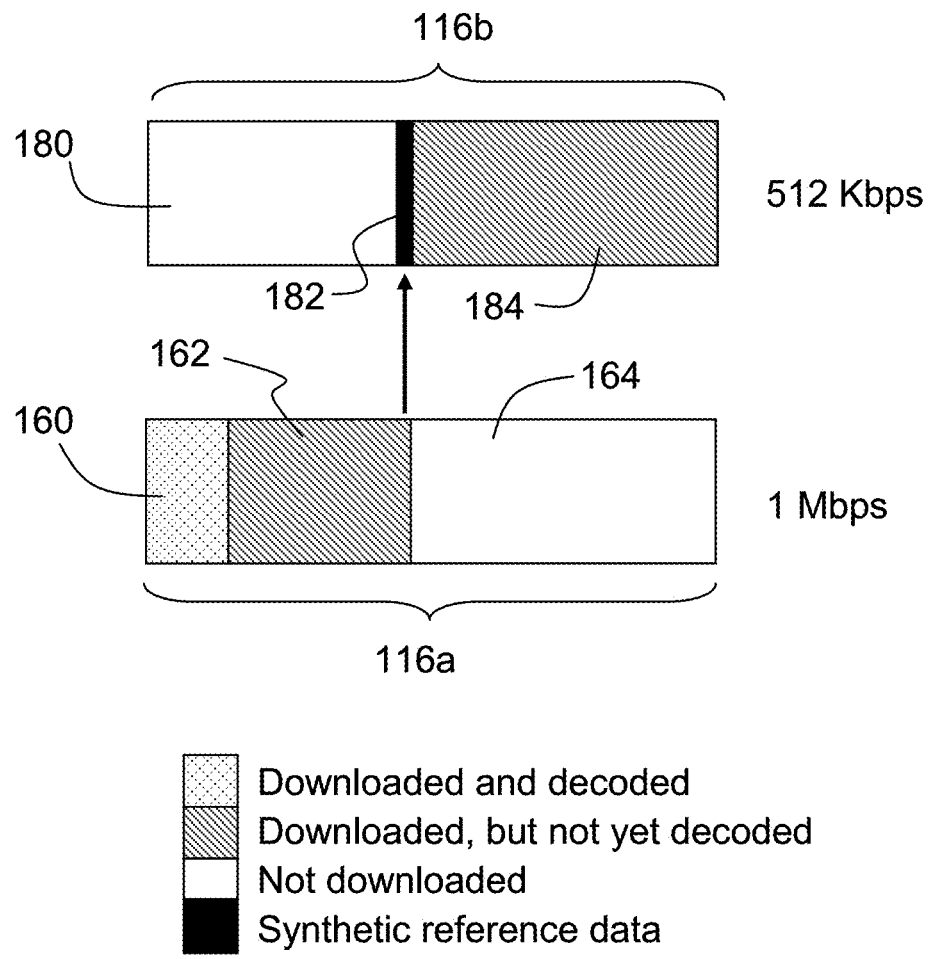
FIG. 7 illustrates a switch between two fragments of different rates, according to a second embodiment of the invention.
Figure 8:
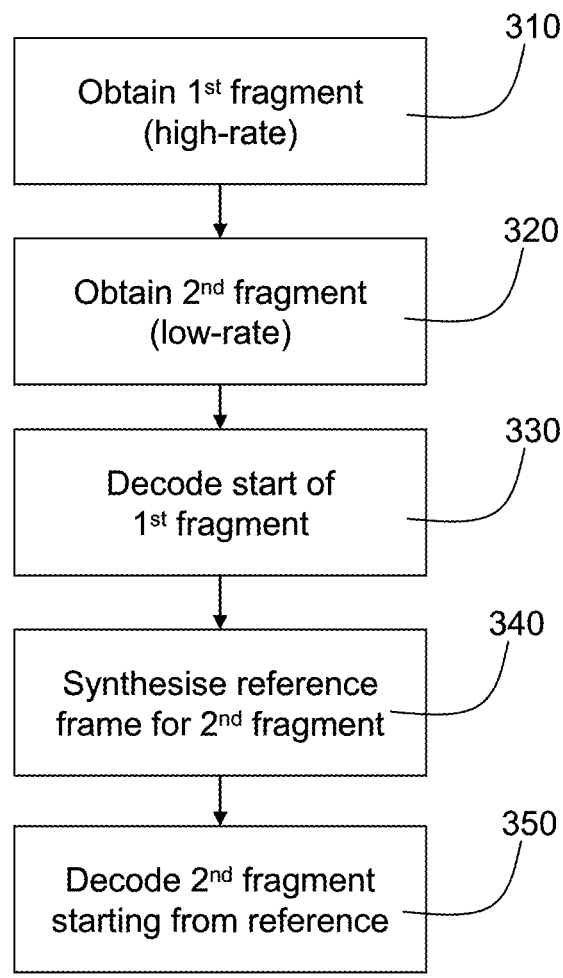
FIG. 8 shows a flowchart of a method according to the second embodiment.

FIG. 7 illustrates a switch from a high-rate (1 Mbps) representation to a lower-rate (512 Kbps) representation according to this embodiment. A flowchart of the method is shown in FIG. 8. The client application is initially downloading, decoding and rendering the higher-rate version of the stream. The streaming scheduler 20 has obtained 310 part of a first fragment 116a at the higher-rate. A first portion 160 of the fragment 116a has been decoded by the decoder 50 and rendered by the renderer 52 on the display 54. A further portion 162 of the fragment 116a has been received 310 and placed in a buffer-memory by the reader 30. A final portion 164 of the fragment 116a has not yet been received from the server. The difference between the playback position and the downloaded position is the buffer. This corresponds to the duration of the further portion 162 of the fragment 116a.

Due to a reducing network throughput, the bandwidth becomes less than the data-rate of the current representation. This causes the buffer occupancy to reduce until a threshold is reached. Upon reaching this threshold, the client application decides to switch to a lower data-rate version of the stream—that is, stop downloading the higher-rate representation and start downloading the lower-rate one.

The application uses a method similar to that described earlier above (in connection with the first embodiment) to download the relevant part for the lower-rate representation. The scheduler 20 requests 320 the fragment 116b of the lower-rate stream which corresponds to the time-instant of the last frame in the buffer that has been downloaded from the higher-rate fragment 116a. This is the last frame of the portion 162 that has been received but not yet decoded/played. Preferably, the scheduler requests 320 only a part of the lower-rate fragment 116b, by using the HTTP GET command with a specific byte-range. The range to be requested can be estimated by a calculation equivalent to that used in the first embodiment. In response to the request, the scheduler 20 receives 320 (at least) a part 184 of the second, lower-rate fragment. As shown in FIG. 7, an initial part 180 of the second fragment is not obtained.

The video decoder 50 still decodes 330 the higher-rate representation of the first fragment 116a, up until it reaches the latest available video frame in the buffer. Meanwhile, the buffer for the lower-rate representation is growing in size. Based on the successfully received (and now decoded) portion 162 of the first fragment, the application synthesises the reference frame 182 needed to begin decoding the second, lower-rate fragment. This reference frame 182 is inserted into the lower-rate buffer before the downloaded portion 184 of the second fragment 116b. As noted above, the synthetic reference frame is not identical to the real lower-rate reference frame but it is a "good enough" approximation.

The application switches the video decoder from the higher stream to the lower one. The application uses the extra inserted frame 182 in the decoder 50, to decode 350 the subsequent frames 184 of the second fragment 116b, but the synthetic frame itself is not rendered. The application then continues decoding and playing the lower-rate video, as normal.

As will be clear from the foregoing explanation, the implementation of this second embodiment requires alteration to the video decoding process—namely, the insertion of an "arbitrary" reference frame in the decoding process, which has not been decoded from the lower-rate bit-stream in the normal way. This modification may be difficult to implement on some platforms, which rely on an external video decoder. In order to overcome this limitation, three approaches are proposed.

The first option is to replace the video decoder. In this case, the default video decoder is replaced by a customised one. The customised video decoder supports two initialization modes: firstly, the standard one by providing video decoder specific configuration information; and secondly, using an arbitrary video reference frame. This decoder can be initialized with the latest available "good enough" video frame from the first fragment 116a as a reference frame, together with decoder-specific configuration information suitable for the data-rate of the second fragment. Thereafter the decoder is fed with video frames from the lower-rate representation. This option is suitable when the video decoder 50 is a software component, and it minimises the changes on the platform by limiting the changes to the video decoder integration.

The second option is to use two decoders: an external decoder; and a separate customised video decoder. This solution can be implemented by switching between decoders. The following actions should be executed:

Disconnect the external video decoder from the video rendering path;

Initialise a customised software video decoder with both the latest available "good enough" video frame (as a reference frame), and decoder-specific configuration;

Parse the lower-rate representation and feed it to the customised video decoder. Once the first I-frame is found, the customised video decoder is switched off;

Initialise the external video decoder with the I-frame; and

Feed the external video decoder with the remaining video frames.

The third option is to use an I-frame video encoder, and a normal decoder. The encoder re-encodes the latest available "good enough" video frame as a (fake) reference I-frame. The encoder settings correspond to the configuration of the lower-rate representation. The encoded "fake" (synthetic) I-frame is used to feed the video decoder as a first frame before the video frames decoded from the lower data-rate representation. Thus, the video decoder receives a compliant video bitstream and consequently requires no modification. The application should ensure that the inserted extra video frame fame is not rendered, to avoid de-synchronization problems between the audio and video signals.

It should be noted that the exact encoding settings may not be available depending on the HTTP streaming standard used. This is the case, for example, when a new representation is obtained for the first time with Apple Live streaming. In order to limit this impediment, it is proposed to parse the new representation during its download, to find the relevant information. Once this configuration information is available, the synthetic I-frame can be generated. There may be a short interruption to playback if the information is not available when the frames of the previous representation have all been rendered.

Note that the above embodiments of the invention have focussed primarily on the video stream. This is because current audio encoding schemes have limited usage of temporal prediction (for example, limited to 2 audio frames—a duration typically less than 50 ms). Thus, the client application can switch from one representation to another by filling the audio decoder 40 with a silent audio frame. This re-initialises the audio decoder, which can thereafter be fed with audio frames of the new representation.

Embodiments of the present invention can be used in all applications that are capable of handling adaptive HTTP streaming sessions. One important application targeted by this invention is an audio/video player that can be used to watch on-demand movies and live television streams. These applications can run on televisions (optionally using a set-top box), personal computers, mobile phones, or internet-tablets—in other words, on any portable or non-portable device connected on internet and having enough computing resources to receive and decode compressed audio and video streams.

Embodiments of the invention are applicable (at least) to all current and future HTTP streaming protocols that exhibit the following characteristics:

The client requests the audio and video data by using HTTP through the "GET" method on top of TCP. The data are split into several chunks (fragments).

The adaptive feature is enabled, and so the content is available in several alternative representations corresponding to several qualities and bitrates.

The following acronyms, used herein, are listed now for convenient reference:

3G $3^{rd}$ Generation, also known as UMTS, Universal Mobile Telecommunications System 3GPP $3^{rd}$ Generation Partnership Project AV Audio Video HTTP HyperText Transport Protocol IIS Microsoft Internet Information Services RTSP Real Time Streaming Protocol UDP User Datagram Protocol TCP Transport Control Protocol While the invention has been illustrated and described in detail in the drawings and foregoing description, such illustration and description are to be considered illustrative or exemplary and not restrictive; the invention is not limited to the disclosed embodiments.

For example, those skilled in the art will recognise that the sequencing of operations in methods according to the various embodiments is not fixed, but variable. This applies, in particular, to the sequencing of requests from the client to the server for different fragments from different versions of the media stream.

In the description of the first embodiment, above, it was assumed that the client wishes to switch from a representation having a first, lower data-rate to a representation having a second, higher data-rate. However, the method of the first embodiment can also be applied when switching from a high to a low data-rate.

Likewise, in the second embodiment, it was assumed that the client is switching from a high to a low data-rate. However, the same method can also be applied when switching from a low to a high data-rate. When switching to a higher data rate, the synthetic reference frame will need to be generated from lower bit-rate data from the first representation. This may mean that the source data has a lower spatial resolution (smaller frame size, in pixels) than is needed to generate the reference data. This problem may be solved by re-sampling the image data at a higher resolution. A filter enhancing the smoothness of the picture may chosen for the up-sampling process. Suitable filters include, but are not limited to, bi-linear up-sampling. Although the quality of the synthetic reference data obtained in this way may be lower than the real reference data of the second representation, the difference may be minimal. Also, any errors introduced will propagate only until the next I-frame in the second representation.

Note also that, in the method of the second embodiment, it is not essential that the synthetic reference frame is an I-frame. Depending on the particular choice of video coding algorithm, other types of frame may be used as reference frames. For example, one P-frame may be predicted from another P-frame. For this reason, the step of synthesising reference data may comprise synthesising any type of frame that may be needed as a reference frame for decoding the second representation. Those skilled in the art will understand that the example of I-frames is used when describing the second embodiment merely for simplicity and clarity. In some cases, it may be necessary to synthesise more than one reference frame. For example, if the first frame of the second representation is a B-frame, it will require two synthetic reference frames in order to be decoded properly.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of receiving a media stream provided in a plurality of different, alternative encoded representations,
   each representation comprising a series of discrete fragments over time intervals, the method comprising,
   when switching from a first representation having a first data-rate to a second representation having a second data-rate:
   obtaining at least a part of a first fragment from the first representation;
   obtaining at least a part of a second fragment from the second representation,
   wherein the first and second fragments are in time intervals that overlap at least partially;
   decoding the at least part of the first fragment;
   creating a synthetic frame for the second representation by re-encoding the last frame decoded from the at least part of the first fragment using encoder settings corresponding to the encoding of the second representation; and
   decoding the at least part of the second fragment using the synthetic frame as a reference frame for initializing decoding of the at least part of the second fragment,
   thereby switching from receiving the stream in the first representation to receiving it in the second representation.

2. The method of claim 1, wherein the step of obtaining the part of the second fragment comprises requesting a part of the second fragment corresponding to a remaining part of the first fragment that was not obtained.

3. The method of claim 1, wherein the first data-rate is higher than the second data-rate.

4. The method of claim 1, further comprising a preceding step of determining that decoding should switch to the second representation, by at least one of:
   detecting one of an excess and a shortage of data at the first data-rate in a memory buffer; and
   measuring network throughput.

5. A non-transitory computer readable storage medium comprising computer program code adapted to perform the steps of claim 1 when said program is run on a computer.

6. A non-transitory computer-readable storage medium storing instructions that, when executed by a processor, cause the processor to execute steps comprising:
   obtaining at least a part of a first fragment from a first representation, wherein a representation comprises a series of discrete fragments over time intervals;
   obtaining at least a part of a second fragment from a second representation, wherein the first and second fragments are in time intervals that overlap at least partially;
   decoding the at least part of the first fragment;
   creating a synthetic frame for the second representation by re-encoding the last frame decoded from the at least part of the first fragment using encoder setting corresponding to the encoding of the second representation; and
   decoding the at least part of the second fragment using the synthetic frame as a reference frame for initializing decoding of the at least part of the second fragment,
   thereby switching from receiving the stream in the first representation to receiving it in the second representation.

7. The non-transitory computer-readable storage medium of claim 6, wherein the different representations are encoded at different data-rates.

8. The non-transitory computer-readable storage medium of claim 7 wherein, when it is desired to switch from a first representation having a first data-rate to a second representation having a second data-rate, the method comprises:
   obtaining at least a part of the second fragment from the second representation;
   obtaining at least a part of the first fragment from the first representation;
   detecting the position in the second fragment of reference data from which it is possible to start decoding the second representation;
   decoding the first fragment until the position corresponding to the reference data; and
   decoding the second fragment, starting with the reference data.

9. The non-transitory computer-readable storage medium of claim 8, comprising:
   detecting the position of the reference data in the second fragment; and
   in response, obtaining only a part of first fragment, wherein the size of the part obtained depends on the detected position.

10. The non-transitory computer-readable storage medium of claim 9 wherein the step of obtaining only a part of the first fragment comprises either:
    cancelling an earlier request to obtain the whole fragment; or
    requesting a specified part of the fragment.

11. The non-transitory computer-readable storage medium of claim 8, wherein the first data-rate is lower than the second data-rate.

12. The non-transitory computer-readable storage medium of claim 8, wherein, upon deciding to switch to the second data-rate, a subsequent fragment at the second rate is requested.

13. The non-transitory computer-readable storage medium of claim 7, further comprising a preceding step of determining that decoding should switch to the second representation, by:
    detecting an excess or shortage of data at the first data-rate in a memory buffer; and/or measuring network throughput.

14. Receiver system for receiving a media stream provided in a plurality of different,
alternative encoded representations, each representation comprising a series of discrete fragments over time intervals, the system comprising:
a streaming scheduler, adapted to switch from a first higher data-rate representation to a second lower data-rate representation by:
obtaining at least a part of a first fragment from a first one of the representations; and
obtaining at least a part of a second fragment from a second one of the representations, wherein the first and second fragments are in time intervals that overlap at least partially; and
a decoder, adapted to:
decode at least part of the first fragment;
create a synthetic frame for the second representation by re-encoding the last frame decoded from the at least part of the first fragment using encoder settings corresponding to the encoding of the second representation; and
decode the at least part of the second fragment using the synthetic frame as a reference frame for initializing decoding of the at least part of the second fragment, the system thereby being operable to switch from receiving the stream in the first representation to receiving it in the second representation.

15. The system of claim 14 wherein, when it is desired to switch from a first lower data-rate representation to a second higher data-rate representation, the scheduler is operable to:
obtain at least a part of the second fragment from the second, higher-rate representation; and
obtain at least a part of the first fragment from the first, lower-rate representation, and
wherein the system further comprises a stream reader, adapted to detect the position in the second fragment of reference data from which it is possible to start decoding the second representation, and
wherein the decoder is adapted to:
decode the first fragment until the position corresponding to the reference data; and
decode the second fragment, starting with the reference data.

16. The system of claim 14, wherein, when it is desired to switch from a first higher data-rate representation to a second lower data-rate representation, the scheduler is operable to:
obtain at least a part of the first fragment from the first, higher-rate representation;
obtain at least a part of the second fragment from the second, lower-rate representation, and
the decoder is adapted to:
decode the obtained part of the first fragment;
synthesise reference data for the second representation, based on the obtained part of the first representation; and
decode a successive part of the second fragment, using the synthesised reference data.

17. The method of claim 1, wherein synthesizing reference data comprises approximating a frame from which the successive part of the second fragment can be decoded by reducing the resolution of data decoded from the at least part of the first fragment.

18. The non-transitory computer-readable storage medium of claim 6, wherein synthesizing reference data comprises approximating a fragment from which the second fragment can be decoded by reducing the resolution of the data decoded from the at least part of the first fragment.

19. The receiver system of claim 14, wherein the decoder is adapted to approximate a fragment from which the second fragment can be decoded by reducing the resolution of the data decoded from the at least part of the first fragment.

* * * * *